United States Patent
Moon et al.

(10) Patent No.: US 7,986,492 B2
(45) Date of Patent: Jul. 26, 2011

(54) PROCESS FOR FILLING A PATTERNED MEDIA OF A HARD DISK WITH UV-CURED LUBRICANT

(75) Inventors: Kiseok Moon, Pleasanton, CA (US); Hyungjai Lee, Cupertino, CA (US); Carl Xiaodong Che, Saratoga, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 860 days.

(21) Appl. No.: 11/899,650

(22) Filed: Sep. 6, 2007

(65) Prior Publication Data
US 2009/0067091 A1    Mar. 12, 2009

(51) Int. Cl.
*G11B 5/82*    (2006.01)
*G11B 5/66*    (2006.01)
(52) U.S. Cl. ....................... 360/135; 428/848; 428/835.8
(58) Field of Classification Search .................. 360/135; 428/834, 835.6–835.8, 848
See application file for complete search history.

(56) References Cited

U.S. PATENT DOCUMENTS

| | | | |
|---|---|---|---|
| 5,030,478 A | 7/1991 | Lin et al. | |
| 6,602,620 B1 * | 8/2003 | Kikitsu et al. | 428/842.2 |
| 6,656,333 B2 * | 12/2003 | Lee et al. | 204/192.16 |
| 7,438,982 B2 * | 10/2008 | Suwa et al. | 428/826 |
| 7,760,467 B2 * | 7/2010 | Kimura et al. | 360/135 |
| 2004/0101715 A1 * | 5/2004 | Stirniman et al. | 428/694 TF |
| 2004/0209123 A1 * | 10/2004 | Bajorek et al. | 428/694 TP |
| 2004/0240327 A1 * | 12/2004 | Sendur et al. | 369/13.35 |
| 2005/0196650 A1 * | 9/2005 | Suwa et al. | 428/848 |
| 2006/0203365 A1 * | 9/2006 | Nakao | 360/16 |
| 2006/0269795 A1 * | 11/2006 | Yanagita et al. | 428/833 |
| 2007/0070541 A1 * | 3/2007 | Suzuki et al. | 360/75 |
| 2007/0070549 A1 * | 3/2007 | Suzuki et al. | 360/135 |
| 2007/0217075 A1 * | 9/2007 | Kamata et al. | 360/135 |
| 2008/0075978 A1 * | 3/2008 | Weller et al. | 428/826 |
| 2008/0084635 A1 * | 4/2008 | Lee et al. | 360/135 |

* cited by examiner

*Primary Examiner* — William J Klimowicz

(57) ABSTRACT

A patterned disk for a hard disk drive. The patterned disk includes a magnetic material over a substrate. The magnetic material includes a plurality of grooves. The grooves are filled with a lubricant that is hardened with UV exposure or some other hardening process. The lubricant provides a protective cover for the magnetic material exposed by the grooves. The use of lubricants in the fabrication of disks is known, thus the process does not introduce a process step that requires special equipment and/or process development.

9 Claims, 3 Drawing Sheets

PROCESS FOR FILLING A PATTERNED MEDIA OF A HARD DISK WITH UV-CURED LUBRICANT

BACKGROUND OF THE INVENTION

1. Field of the Invention

The subject matter disclosed generally relates to disk media of hard disk drives.

2. Background Information

Hard disk drives contain a plurality of heads that are magnetically coupled to rotating disks. The heads write and read information by magnetizing and sensing the magnetic fields of the disk surfaces.

There are generally two different types of magnetic heads, horizontal recording heads and perpendicular recording heads ("PMR heads"). Horizontal recording heads magnetize the disk in a direction that is essentially parallel with the outer surface of the disk. PMR heads magnetize the disk in a direction essentially perpendicular to the outer surface of the disk. PMR heads are preferred because perpendicular recording allows for higher bit densities and corresponding increases in the data capacity of the drive.

The areal density of perpendicular recording is limited by magnetic cross-talk between adjacent areas of the disks. One approach to limiting cross-talk is to create a disk composed of a plurality of magnetic dots that are separated by grooves. The grooves inhibit magnetic cross-talk between the magnetic dots. Such disks are commonly referred to as bit patterned media. The grooves create exposed areas of the magnetic material that can oxidize and create undesirable corrosion.

BRIEF SUMMARY OF THE INVENTION

A patterned disk for a hard disk drive. The patterned disk includes a magnetic material over a substrate. The magnetic material has a plurality of grooves. The grooves are filled with a lubricant.

DETAILED DESCRIPTION

Disclosed is a patterned disk for a hard disk drive. The patterned disk includes a magnetic material over a substrate. The magnetic material includes a plurality of grooves. The grooves are filled with a lubricant that is hardened with UV exposure or some other hardening process. The lubricant provides a protective cover for the magnetic material exposed by the grooves. The use of lubricants in the fabrication of disks is known, thus the process does not introduce a process step that requires special equipment and/or process development.

Figure 1:
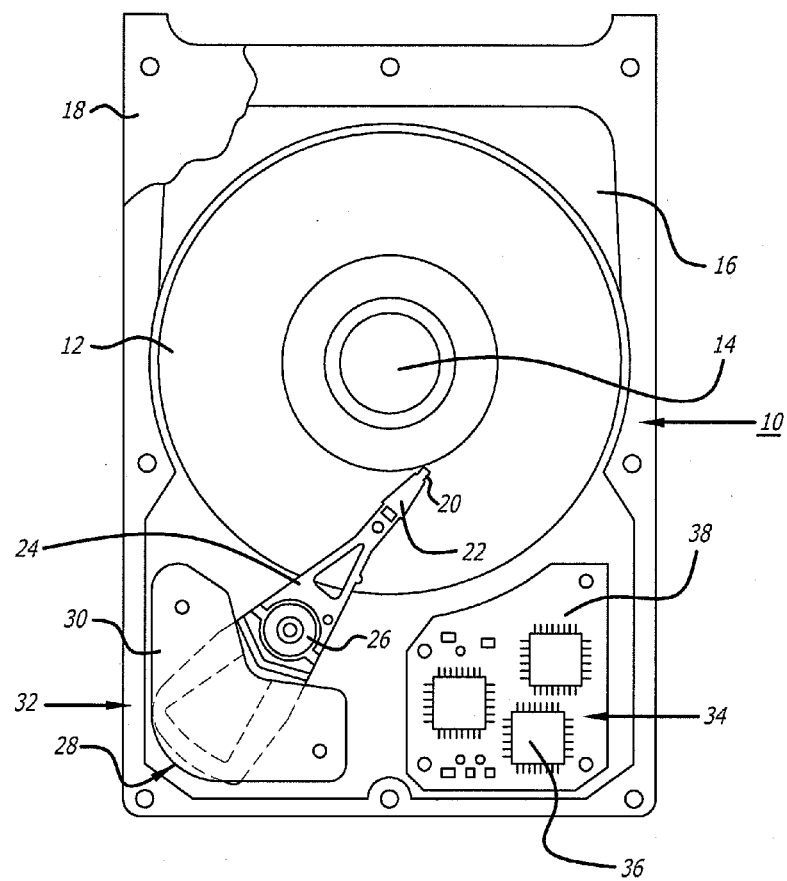
FIG. 1 is a top view of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

Figure 2:
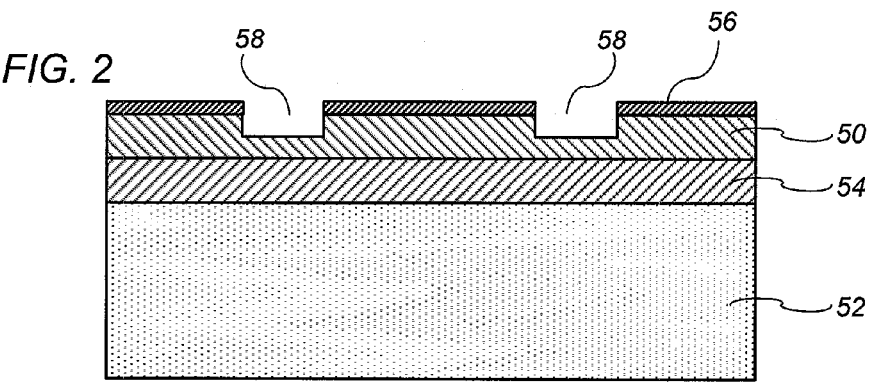
FIG. 2 is an enlarged view of a disk of a hard disk drive after grooves are formed in a magnetic layer of the disk.

FIG. 2 shows an embodiment of the disk 12 in an intermediate process step. The disk 12 includes a magnetic material 50 located over a substrate 52. The disk 12 may have an intermediate layer 54 as is known in the art. The top surface of the magnetic material 54 may be protected by a layer of protective diamond-like material 56. A plurality of grooves 58 are formed in the magnetic material 50. The grooves 58 can be formed by any known processes such as ion milling, chemical etching or E-beam lithography. The grooves 58 expose portions of the magnetic material to the environment which may result in corrosion of the material.

Figure 3:
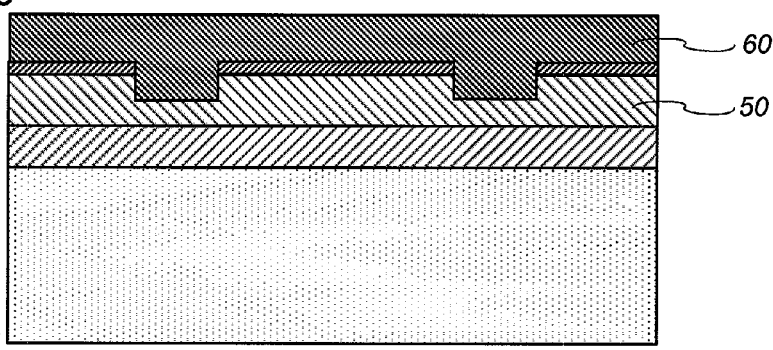
FIG. 3 is an enlarged view showing a lubricant applied to the disk.

As shown in FIG. 3, a lubricant 60 is applied to a magnetic material 50. The lubricant 60 is in a fluidic or semi-fluid state such that the lubricant material flows into the grooves 58. The lubricant 60 can be any known lubricant used on disk drive media. By way of example, the lubricant may be a perfluoropolyether also known as PFPE.

Figure 4:
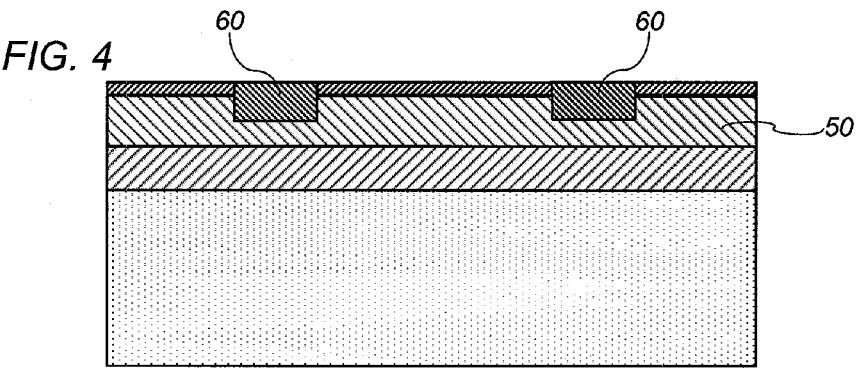
FIG. 4 is an enlarged view showing lubricant washed from a top surface of the disk.

As shown in FIG. 4, the lubricant material 60 can be washed from the magnetic material so that lubricant 60 only remains in the grooves 58. The lubricant material 60 extends above the level of the magnetic material 54, to completely fill the grooves 58, and is supported by the layer of protective diamond-like material 56, of FIG. 2.

Figure 5:
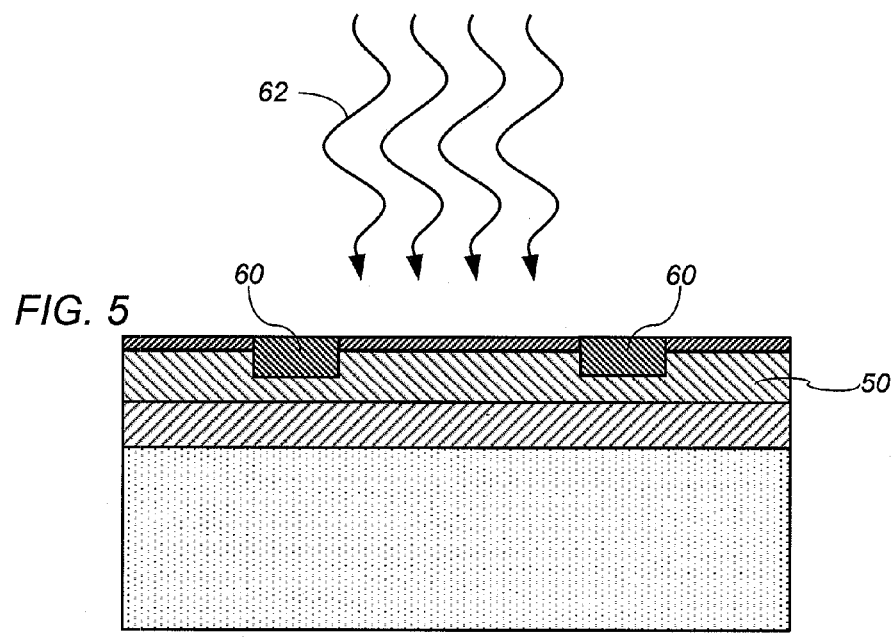
FIG. 5 is an enlarged view illustrating the lubricant being hardened within the grooves of the magnetic material.

As shown in FIG. 5, the lubricant 60 can be hardened and bonded to the magnetic material 50 by exposure to UV light or heat 62. A process for bonding lubricant to magnetic material of a disk media is described in U.S. Pat. No. 5,030,478, which is hereby incorporated by reference.

Figure 6:
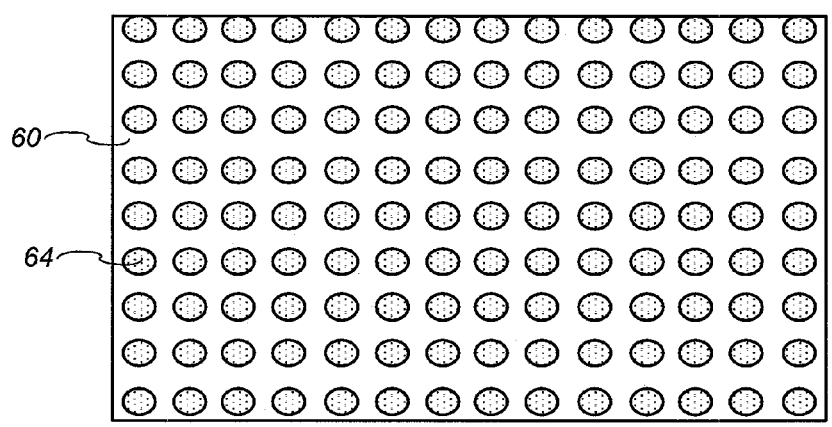
FIG. 6 is an enlarged top view of the disk showing a plurality of magnetic dots separated by the lubricant.

As shown in FIG. 6, the magnetic material 50 is arranged into a plurality of dots 64 that are separated by the lubricant material 60. The lubricant 60 inhibits magnetic cross-talk between the magnetic dots 64 and provides a protective layer for the magnetic material within the grooves, without introducing a special process or requiring additional process equipment not already used in the fabrication of disk media.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A patterned magnetic disk for a hard disk drive, comprising:
   a substrate;
   a magnetic material over said substrate, said magnetic material having a plurality of grooves that separate a plurality of magnetic dots; and,
   a lubricant located within said grooves of said magnetic material, said lubricant filling said grooves, and extending above an uppermost level of said magnetic material, and does not cover said dots.

2. The disk of claim 1, wherein said lubricant is a hardened solid material.

3. The disk of claim 1, further comprising an intermediate layer between said magnetic material and said substrate.

4. The disk of claim 1, wherein said lubricant is a perfluoropolyether material.

5. A hard disk drive, comprising:
   a base plate;
   a spindle motor coupled to said base plate;
   a disk coupled to said spindle motor, said disk including;
   a substrate;
   a magnetic material over said substrate, said magnetic material having a plurality of grooves that separate a plurality of magnetic dots;
   a lubricant located within said grooves of said magnetic material, said lubricant filling said grooves, and extending an uppermost above level of said magnetic material, and does not cover said dots;
   an actuator arm coupled to said base plate;
   a voice coil motor coupled to said actuator arm; and,
   a head coupled to said actuator arm and said disk.

6. The disk drive of claim 5, wherein said lubricant is a hardened solid material.

7. The disk drive of claim 5, further comprising an intermediate layer between said magnetic material and said substrate.

8. The disk drive of claim 5, wherein said lubricant is a perfluoropolyether material.

9. The disk drive of claim 5, wherein said head is a perpendicular recording head.

\* \* \* \* \*